United States Patent [19]

Glass, III et al.

[11] Patent Number: 4,766,374

[45] Date of Patent: Aug. 23, 1988

[54] FUEL CHANNEL FLATNESS MEASUREMENT

[75] Inventors: Samuel W. Glass, III; John C. Griffith, both of Lynchburg; John D. Brew, Forest; Charles C. England, Jr.; John M. Phillips, both of Lynchburg, all of Va.

[73] Assignee: The Babcock & Wilcox Company, New Orleans, La.

[21] Appl. No.: 931,474

[22] Filed: Nov. 14, 1986

[51] Int. Cl.$^4$ ............... G01B 7/28; G01R 33/12; G21C 17/00

[52] U.S. Cl. ............... 324/207; 33/533; 324/226; 324/243; 324/262; 364/560; 376/249

[58] Field of Search ............... 324/206–208, 324/226, 229, 234, 236, 239, 242, 243, 262; 33/502, 504, 533, 552; 364/560, 561; 376/249, 254

[56] References Cited

U.S. PATENT DOCUMENTS

| | | | |
|---|---|---|---|
| 3,621,580 | 11/1971 | Tovaglieri | 33/502 X |
| 3,875,667 | 4/1975 | Wilke | 33/533 |
| 4,048,009 | 9/1977 | Weilbacher | 33/533 X |
| 4,274,205 | 6/1981 | Starr et al. | 33/502 |
| 4,288,747 | 9/1981 | Kawabata et al. | 324/243 X |
| 4,583,297 | 4/1986 | Jewell | 33/533 |
| 4,589,082 | 5/1986 | Parker et al. | 364/561 |

*Primary Examiner*—Gerard R. Strecker
*Attorney, Agent, or Firm*—Robert J. Edwards; D. Neil LaHaye

[57] ABSTRACT

A fuel channel flatness measuring system. A stationary measuring unit which allows measuring of two sides of fuel channels without detaching the fuel channel from the crane send warp and axial position electronic signals to conditioning electronics which amplify and digitize the signals for computer use. A computer analysis unit receives the signals and processes and corrolates them to generate a contour profile of the entire length of the measured fuel channel. Fixed and spring loaded rollers mounted on the measuring unit and in rolling contact with the fuel channel guide the fuel channel and allow the movement caused by warp which results in the generated signals.

6 Claims, 2 Drawing Sheets

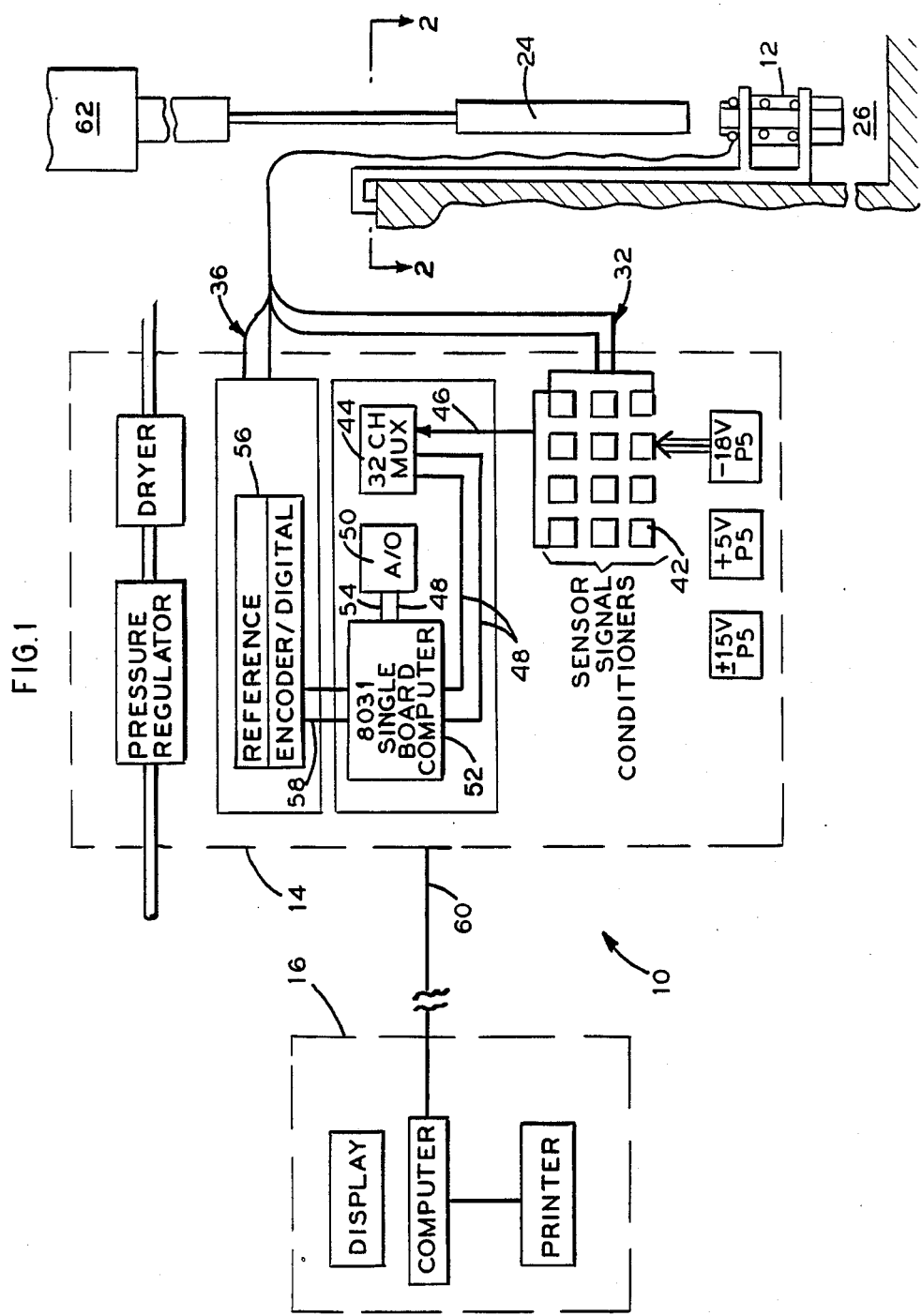

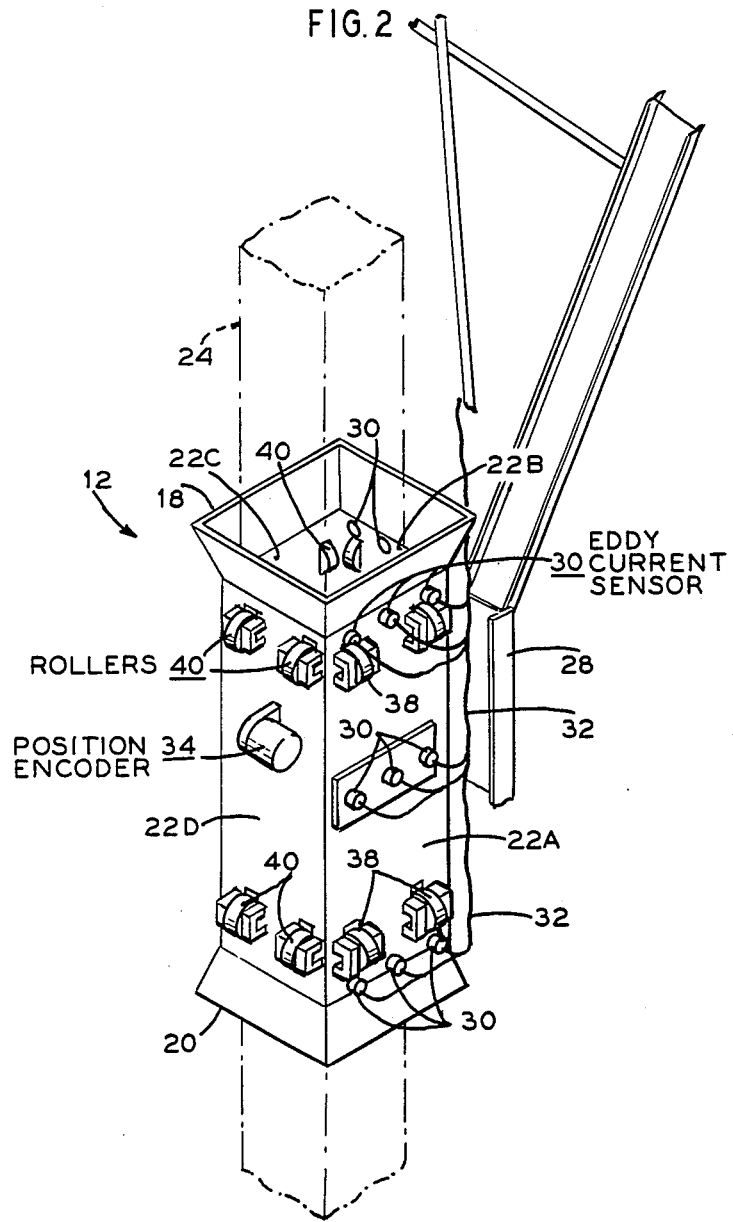

FUEL CHANNEL FLATNESS MEASUREMENT

BACKGROUND OF THE INVENTION

1. Field of the Invention

The present invention relates to inspecting fuel channels and more particularly to generating a flatness profile of a measured channel.

2. General Background

Boiling water reactor (BWR) fuel channels are routinely disposed of prematurely because a small percentage of these channels warp (bow and bulge) to the extent that the control grid spacers between the channels bind against the channel walls and cannot be inserted or withdrawn. Current methods for inspecting these channels requires placing the fuel assembly in a fixture and moving sensors, either linear variable displacement transformers (LVDT), eddy current, or ultrasonic transducers (UT), along the face. A numerical indication of the flatness of the channel is generated by measuring the distance from a physically flat or mechanically corrected flat reference plane to the channel surface. This technique requires a large rigid structure to minimize errors from flexure and to support the moving transport on which the sensors are mounted. The polar crane used to move the channels to the measurement fixture must be disconnected to minimize vibration and associated measurement error. In addition, the large number of mechanical moving parts in such an arrangement are subject to excessive wear and failure rates. Flatness measuring devices known in the art include the following.

U.S. Pat. No. 3,875,667 entitled "In-Line Straightness Sensing Device" issued to Wilke discloses a device for sensing the straightness of a running length of rod or wire wherein a pair of sensors are disposed perpendicularly to each other adjacent the rod whereby deviations along the X—X and Y—Y axis of the rod are sensed, the sensors being connected to a readout device for displaying the sensed deviations.

U.S. Pat. No. 4,048,009 entitled "Method Of and Apparatus For Checking The Dimensions of the Extensions Of The Control Rods Of A Nuclear Reactor" issued to Weilbacher discloses a method of checking the dimensions of the extensions of control rods wherein measuring sensors arranged in accordance with the profiles of the extensions and calibrated by reference to the support move along the extension and measure the distance between the sensors and the extension at a plurality of levels.

U.S. Pat. Nos. 3,511,091 entitled "Device For Monitoring Parallel Tubular Elements", 3,596,362 entitled "Surface Measuring Apparatus", 3,621,580 entitled "Machine For The Dimensional Control Of Elements For Nuclear Fuels", 3,664,922 entitled "InService Inspection Of Reactor Vessel Welds", 3,724,084 entitled "Alignment Apparatus", 4,574,494 entitled "Device For Determning The Profile Of The Charging Surface Of A Shaft Furnance", 4,577,497 entitled "Apparatus And Method For Measuring The Wear Of Railroad Rail", 4,583,294 entitled "Position Sensing Apparatus", and 4,598,483 entitled "Apparatus And Method For Verification Of Jacket For Floppy Disks" disclose methods and systems for dimensional measurement and are representative of the known art.

U.S. Pat. No. 4,048,009 to Weilbacher is similar to the measuring systems presently in use. The control rod drives are anchored top and bottom to a rigid fixture. Sensors are then moved along a vertically or horizontally oriented structure to calibrate the sensors and travel mechanism. The sensors are then moved along the rod to measure the surface profile.

U.S. Pat. No. 3,875,667 to Wilke only measures the flatness of the rod or wire as a displacement of a center contact with respect to two additional contact points. A single number is displayed.

The patents do not provide solutions to existing problems in the art. Weilbacher requires the use of a large bulky structure with a long flatness reference which must be mechanically corrected and calibrated while Wilke provides only a single reference number to indicate displacement. Neither system incorporates the axial position and displacement to develop a contour profile of the item being measured.

SUMMARY OF THE INVENTION

The present invention solves the aforementioned problems by providing a measurement system having a short flatness reference and which characterizes the full contour of the fuel channel using the short sensor array. What is provided is a system which uses the existing fuel handling bridge as the main moving component. A measurement unit is supported under the water in an inspection pool so that a fuel channel to be inspected may be directed through the unit. Multiple sensors which do not make contact with the fuel channel being measured are positioned on adjacent sides of the unit to allow inspection and measurement of two faces of the fuel channel at one time. A position encoder on one face of the measurement unit provides the axial position of the fuel channel being measured. The axial position of the fuel channel and sensor to channel surface measurement are integrated by pool side instrumentation and computer analysis to generate and provide a contour profile of the fuel channel over the entire length of the channel. Measuring two adjacent faces of the fuel channel is normally adequate to provide data on the channel as deformation tends to be symmetrical on opposing faces. If it is desired to inspect all four faces, the channel may be rotated 180° and reinspected.

In view of the above, it is an object of the present invention to provide a fuel channel flatness measurement system capable of inspecting a fuel channel without decoupling the channel from the fuel handling ridge.

It is another object of the present invention to provide a measurement system which allows inspection of two faces of a fuel channel at one time.

It is a further object of the present invention to provide a measurement system capable of providing a contour profile of the entire length of the fuel channel.

BRIEF DESCRIPTION OF THE DRAWINGS

For a further understanding of the nature and objects of the present invention, reference should be had to the following description, taken in conjunction with the accompanying drawings in which like parts are given like reference numerals and, wherein:

FIG. 1 provides a schematic view of the invention; and

FIG. 2 illustrates a perspective view of the measuring unit.

DETAILED DESCRIPTION OF THE PREFERRED EMBODIMENT

Referring now to the drawings, it can be seen in FIG. 1 that the invention is generally referred to by the number 10. Fuel channel flatness measurement system 10 is generally comprised of measurement unit 12, pool side conditioning electronics 14, and computer analysis unit 16.

Measurement unit 12, as best seen in FIG. 2, is substantially a box-like structure having open top and bottom ends 18, 20 formed by sides 22A, 22B, 22C, 22D. Sides 22A–D are rigidly attached with top and bottom ends 18, 20 being left open to form a passage through which a fuel channel 24 may be directed for measurement purposes. Measurement unit 12 may be supported in inspection pool 26 by means known in the art such as support structure 28. Measurement unit 12 is provided on two adjacent sides 22A, B, with a multichannel array of eddy current sensors 30 which measure the sensor to channel surface distance and pass this information in the form of electronic signals to the conditioning electronics 14. In the preferred embodiment adjacent sides 22A, B are each provided with three sets of sensors positioned adjacent the top 18 and bottom 20 and substantially at the center of each side. As illustrated, each set of sensors 30 is preferably comprised of three sensors substantially equally spaced across the width of the side. As seen in FIG. 2, top 18 and bottom 20 are flared outward slightly to allow for easy insertion and removal of fuel channel 24 and the sets of sensors 30 are positioned adjacent the flared portion. Electronic measurement signals generated by sensors 30 are directed to pool side conditioning electronics 14 via sensor cables 32. In order to provide sufficient information to conditioning electronics 14 and computer analysis unit 16 so that a contour profile of the fuel channel may be generated, a position encoder 34 is provided on side 22D. Position encoder 34 is used to constantly determine the precise axial location of fuel channel 24 with respect to measurement unit 12 and forward this information to conditioning electronics 14 via encoder cable 36. Position encoder 34 is used in the preferred embodiment but any suitable device known in the art such as a synchroresolver for detecting the precise axial position of fuel channel 24 is acceptable.

Fixed rollers 38 are positioned on sides 22A and B adjacent the top and bottom sets of sensors 30. Fixed rollers 38 extend through apertures provided in sides 22A, B into the interior of measurement unit 12. Spring loaded rollers 40 are positioned adjacent the top and bottom of sides 22C, D directly opposite fixed rollers 38 on sides 22A, B having sensors 30 and also extend through apertures into the interior of measurement unit 12 for rolling contact with fuel channel 24. The combination of fixed and spring loaded rollers 38,40 thus serve to guide fuel channel 24 through measurement unit 12 while allowing movement of fuel channel 24 toward and away from sensors 30 due to any warpage present in fuel channel 24. The sensors 30 detect these variations and forward them to conditioning electronics 14 along with the axial position of fuel channel 24 detected by position encoder 34.

Referring to FIG. 1, conditioning electronics 14 conditions the signals from sensors 30 and position encoder 34 for further processing by computer analysis unit 16. Essentially, the signals are converted into digital form so as to be computer readable and combined and then forwarded to computer analysis unit 16. Signals from sensors 30 are forwarded to sensor signal conditioner 42 for amplification so that the signals may be more readily processed. These amplified signals are forwarded to multiplexer 44 via cable 46. Multiplexer 44 directs these separate signals from each of sensors 30 via cables 48 to analog to digital converter 50 through computer 52. The converted signals are then directed to computer 52 via cable 54. Axial position indicating signals from position encoder 34 are directed to reference digital encoder 56 via encoder cable 36 wherein the signals are converted from analog to digital and then directed to computer 52 via cables 58. The combined and digitized sensor and encoder signals are then directed to computer analysis unit 16 via line 60.

Conditioning electronics 14 are kept under positive air pressure by a pressure regulator to prevent contamination. A dryer is also used to dehumidify the air surrounding the electronics to protect them from the normally humid atmosphere present in the nuclear work environment.

Computer analysis unit 16 takes the digitized sensor signals over the entire length of fuel channel 24, calculates a radius of curvature from this information, and incorporates this with the digitized axial position signals and the assumption of end fixity to develop and generate a contour profile of the measured surfaces of fuel channel 24. This contour profile may be presented on graphic display or printed media as indicated.

In operation, fuel channel 24 is positioned above measurement unit 12 with crane 62 and then lowered through measurement unit 12. Signals from sensors 30 and position encoder 34 are digitized and combined by conditioning electronics 14 and then processed by computer analysis unit 16 which generates a contour profile of the entire length of the measured surface of fuel channel 24. In this manner, it can be more accuratley determined whether a fuel channel is capable of being reused or must be discarded.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed is:

1. A fuel channel flatness measurement system, comprising:
   a. a measurement unit in which said fuel channel is measured;
   b. conditioning electronics which receive electronic measurement signals from said measurement unit and condition said signals for further processing;
   c. a computer analysis unit which receives said conditioned signals and generates a contour profile of said measured fuel channel; and
   d. said measurement unit comprising:
      i. a box-like structure having open top and bottom ends;
      ii. a multichannel array of sensors mounted on two adjacent sides of said structure which provide measurement signals of sensors to fuel channel surface distance to said conditioning electronics;
      iii. a position encoder mounted on one side of said structure for detecting and providing the axial position of said fuel channel to said conditioning electronics;

iv. a plurality of fixed rollers mounted on said structure adjacent said sensors and extending interior of said structure so as to be in rolling contact with a fuel channel being measured; and
v. a plurality of spring loaded rollers mounted on two sides of said structure substantially opposite said fixed rollers and extending interior of said structure so as to be in rolling contact with a fuel channel being measured.

2. The measurement system of claim 1, wherein three sets of said sensors are positioned on each of said adjacent sides.

3. The measurement system of claim 1, wherein said fixed and spring loaded rollers are mounted adjacent the top and bottom of said measurement unit.

4. A method of measuring fuel channel flatness, comprising:
 a. providing a measuring unit through which said fuel channel is passed, said measuring unit comprising:
  i. a box-like structure having open top and bottom ends;
  ii. a multichannel array of sensors mounted on two adjacent sides of said structure which provide measurement signals of sensor to fuel channel surface distance to said conditioning electronics;
  iii. a position encoder mounted on one side of said structure for detecting and providing the axial position of said fuel channel to said conditioning electronics;
  iv. a plurality of fixed rollers mounted on said structure adjacent said sensors and extending interior of said structure so as to be in rolling contact with a fuel channel being measured; and
  v. a plurality of spring loaded rollers mounted on two sides of said structure substantially opposite said fixed rollers and extending interior of said structure so as to be in rolling contact with a fuel channel being measured;
 b. measuring the warp and axial position of said channel as it is passed thorugh said measuring unit and generating corresponding electronic signals;
 c. providing conditioning electronics for receiving, amplifying, and digitizing said warp and axial position signals; and
 d. providing a computer analysis unit for processing said digitized signals and generating a contour profile of said fuel channel.

5. The method of claim 4, wherein three sets of said sensors are positioned on each of said adjacent sides.

6. the method of claim 4, wherein said fixed and spring loaded rollers are positioned adjacent the top and bottom of said measuring unit.

* * * * *